United States Patent [19]

Leroy

[11] 4,344,418

[45] Aug. 17, 1982

[54] SOLAR COLLECTOR

[75] Inventor: Claude Leroy, Marseilles, France

[73] Assignee: Cosmos Investigations and Research Societe Francaise a Responsabilite Limitee, Levallois-Perret, France

[21] Appl. No.: 167,013

[22] Filed: Jul. 9, 1980

[30] Foreign Application Priority Data

Jul. 16, 1979 [FR] France ............................ 79 18336
Mar. 31, 1980 [FR] France ............................ 80 07224

[51] Int. Cl.³ ............................................ F24J 3/02
[52] U.S. Cl. .................................... 126/443; 126/417; 126/450; 362/253
[58] Field of Search ............... 126/417, 443, 450, 451, 126/427, 432, 422; 362/96, 92, 101, 149, 253, 372, 363, 431, 457, 458

[56] References Cited

U.S. PATENT DOCUMENTS

| | | | |
|---|---|---|---|
| 3,934,573 | 1/1976 | Dandini | 126/440 |
| 4,056,093 | 11/1977 | Barger | |
| 4,136,670 | 1/1979 | Davis | |
| 4,137,903 | 2/1979 | Annett | 126/443 |
| 4,237,868 | 12/1980 | Overton | 126/443 |

FOREIGN PATENT DOCUMENTS 7210688 11/1973 France .
7539258 2/1976 France .

Primary Examiner—Larry Jones
Attorney, Agent, or Firm—Browdy and Neimark

[57] ABSTRACT

A solar collector includes two concentric spheres or hemispheres, the outer sphere or hemisphere being translucent or transparent and the inner sphere or hemisphere being absorbent of the solar radiation. Fluid to be heated is conveyed by an inlet duct in which is inserted a pump, and sprayed by a head in an inner spherical or hemispherical chamber defined by the inner surface wall of the inner sphere or hemisphere. It flows along this inner wall, becomes heated during its passage, is collected at the base of the inner sphere or hemisphere by an outlet duct. The collector is particularly adapted for the production of hot water to heat swimming pools and the like. In its hemispherical form, when placed at the top of a support post, it can be associated with a mating hemispherical, translucent or frosted housing which houses a light bulb. In this form the structure functions as a street lamp or the like.

6 Claims, 3 Drawing Figures

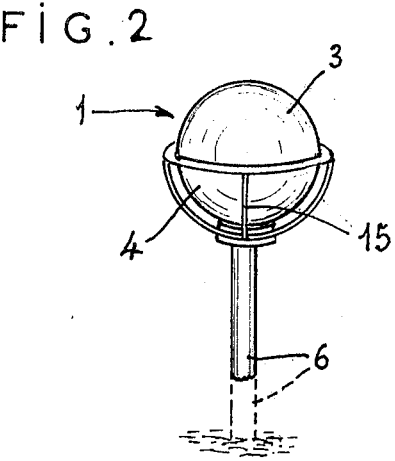
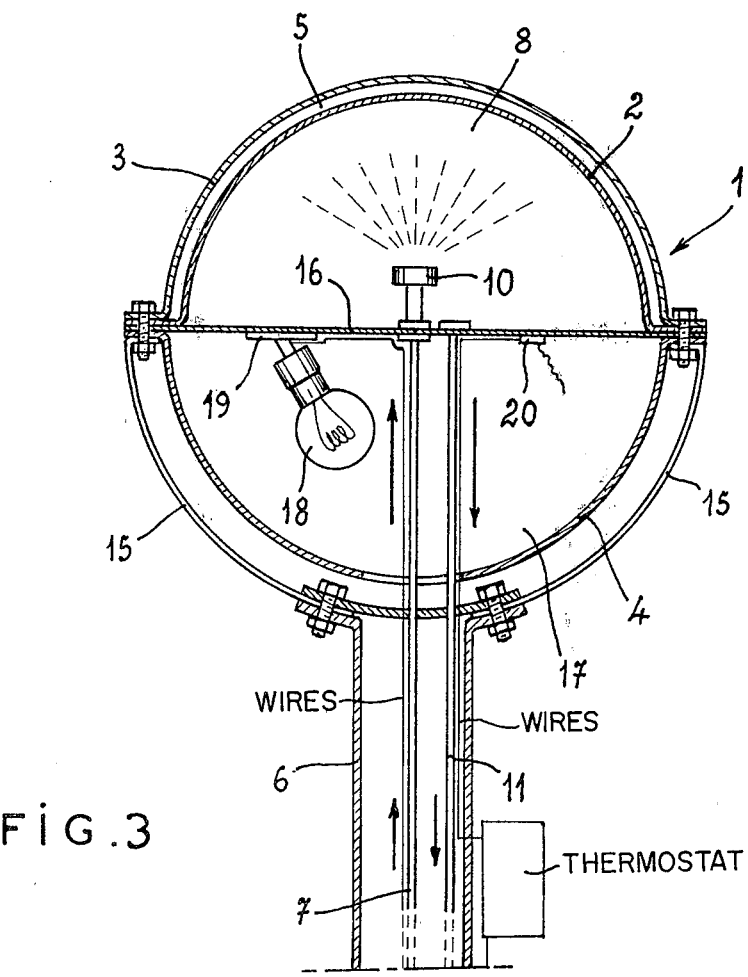

SOLAR COLLECTOR

BACKGROUND OF THE INVENTION

This invention relates to a solar collector of the curved type, having a relatively simple structure. The present invention relates more particularly to solar collectors of spherical or semispherical shape of simplified structure.

The solar collectors belong to the type of those comprising two concentric semispheres or spheres, the outer sphere or semisphere being translucent and the inner sphere or semisphere being absorbent of the solar radiation, as well as inlet and outlet ducts for the fluid to be heated.

The use of such collectors has already been envisaged for the production of hot water by virtue of the "greenhouse effect", the spherical or hemispherical shapes allowing producing hot water with an efficiency which is not substantially changed by the direction and angle of incidence of the solar rays. In such collectors it is advisable to foresee a circulation of the fluid to be heated such that the fluid is heated up when in contact with the wall of the absorbent inner hemisphere or sphere. The arrangements presently known foresee in this regard to have the fluid to be heated flow through a number of ducts and in the inner chambers of the collector, notably chambers bounded by two spherical, hemispherical or semispherical concentric walls. The result is that the production of such spherical or semispherical solar collectors is at present still relatively complex and costly.

It is known from U.S. Pat. No. 4,056,093 to provide a solar energy unit with an upwardly facing opening generally hemispherical double wall boiler including spaced inner and outer hemispherical walls defining a closed chamber therebetween in which to receive a liquid to be heated. An upwardly convex spherical lens structure is supported over the boiler and comprises a closure for the area enclosed within the boundaries of the inner hemispherical wall of the boiler and the lens assembly or structure functions to direct light rays incident thereon onto the inner wall of the boiler. The solar heater additionally includes a hollow downwardly opening transparent hemispherical cover of generally the same radius of curvature as the boiler and which is secured over the lens assembly in outwardly spaced position relative thereto with the center of curvature of the cover substantially coinciding with the center of curvature of the lens assembly.

It is known from U.S. Pat. No. 4,136,670 to provide a solar heating system including an energy absorbent collector dish for receiving solar heat, a supply tube for distributing a heat transfer fluid over the collector dish, a drain pipe for removing the heat transfer liquid from the collector dish and an optical director including an array of converging lenses oriented to receive radiant energy from the sun and to direct the energy onto the collector dish. The array of converging lenses comprises a matrix of double convex lenses that form one half of a hemispherical optical dome, the other half of which possesses an inner reflective surface for reflecting radiant energy onto the collector dish and the optical dome is oriented such that some portion of the lens array faces the sun during an entire day's movement.

SUMMARY OF THE INVENTION

It is the object of the present invention to provide a solar collector having a simplified consequently economical, structure capable of producing hot water with a flow rate and a temperature sufficient for certain applications such as, for example, the heating of the water of swimming pools.

To this effect, in the solar collector according to the present invention, the inlet duct extends towards the top, inside an inner spherical or semispherical chamber of the collector, the inner end of the duct carrying a spray head capable of projecting the fluid to be heated onto the inner wall of the absorbent inner sphere or semisphere, so that the fluid flows and heats up along this wall before being collected at the base of the absorbent inner sphere or semisphere.

The fluid, which is projected by a kind of jet onto the inner wall of the inner sphere or semisphere, recovers the solar energy accumulated in the space bounded by the two concentric spheres or semispheres, by flowing along this wall. The heated up fluid is thus collected, due to the gravity alone, at the base of the inner sphere or semisphere, and is discharged by the outlet duct which directs it towards a place of use and/or storage.

Advantageously, the collector of the present invention may include a vertical supporting stand through which extends the aforementioned inlet duct, the inner end of which carries the spray head, as well as by the outlet duct which collects the heated up fluid at the base of the absorbent inner sphere or semisphere.

Such a spherical or semispherical solar collector, with a support stand, can be in an improved version, form also a lamp post which is thus useful both during daylight and in the hours of darkness.

To this effect, the volume bounded by an outer translucent sphere of the collector is divided, by a plane, substantially horizontal wall into two halves, one of which comprises an inner absorbent hemisphere which, with the aforementioned plane wall, circumscribes an inner hemispheric chamber in which is sprayed the fluid to be heated, while the lower half forms another hemispheric chamber inside which is placed at least one electric bulb, the assembly being mounted at some height above the ground at the top of the support stand through which extend the inlet and outlet ducts for the fluid to be heated, as well as the supply wires of the bulb, so as to form a solar collector combined with a lamp, such as one which includes the aforementioned lamp post to provide, for example, a street light or the like.

The upper portion of the apparatus forms the solar collector as such, in the shape of a substantially half-sphere, but using integrally the spray principle hereinabove stated. The lower portion forms an illuminating device, the translucent outer sphere playing the role, for this portion, of a light diffuser. The assembly has the shape of a globe, allowing a good integration, particularly in an urban environment. The fact that the lower half alone of the globe is used for illuminating purposes is in no way a shortcoming because the upper portion of the diffuser of a street light emits usually, towards the sky, luminous energy which is wasted. On the contrary, the separating plane wall situated above the bulb in the preferred embodiment of the present invention reflecting, thereby allowing, in the case of the present invention, a reflecting of additional luminous energy from the bulb towards the ground, this additional energy being usually lost in the atmosphere. It becomes consequently possible to reduce the power of the bulb, hence an important, desirable economy of energy for lighting can be achieved.

A further remarkable result provided by the just-mentioned embodiment which forms also a street light, and providing an extra energy saving, resides in the possibility of recovering the residual heat of the bulb for heating the fluid during the nightime. For recovering the energy, one has of course to perfect control of the installation, so as to circulate the heat-carrying fluid during the hours of night, the period the bulb supplies a usable heat. To this end, there can be provided, for example, an extra differential thermostat with a temperature probe placed under the separation wall which is over the bulb, for controlling a circulation pump for the fluid and heating the latter with the recovered residual heat of the bulb.

BRIEF DESCRIPTION OF THE DRAWINGS

In any case, the invention will become more apparent from the following description of two embodiments of the curved solar collector, namely, a spherical and a hemispherical version which are given as non limitative examples, reference being made to the accompanying drawings wherein:

FIG. 2 is a perspective, general view of a second embodiment of a solar collector according to the present invention, also forming a street light; and FIG. 3 is a vertical, sectional view, on a larger scale, of the collector FIG. 2.

DETAILED DESCRIPTION OF THE PREFERRED EMBODIMENTS

Figure 1:
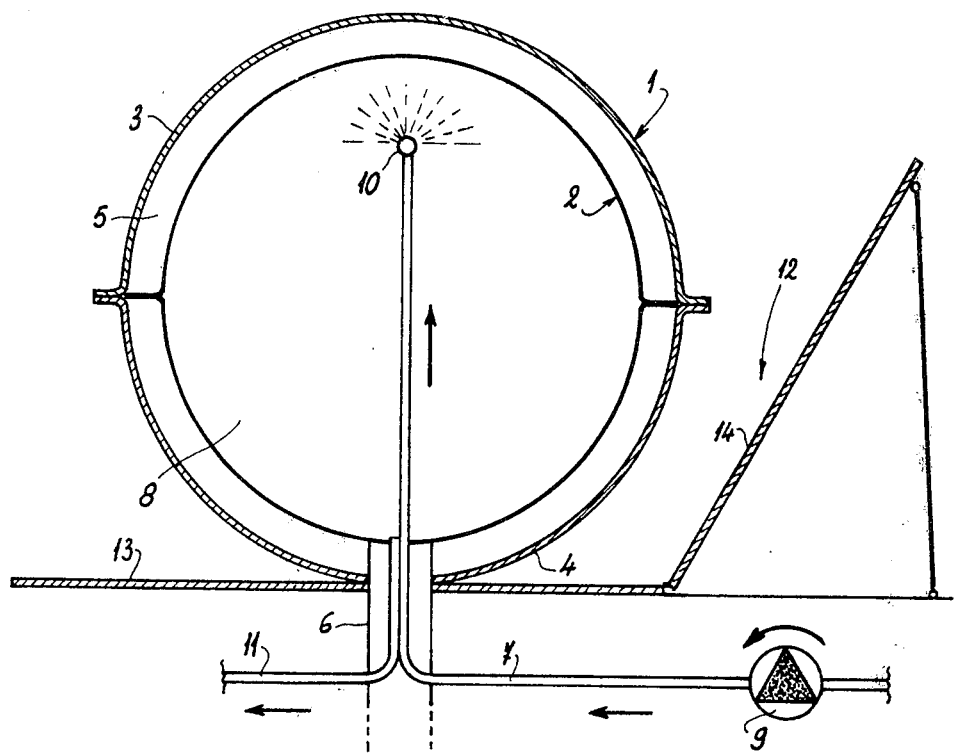
FIG. 1 is a vertical, sectional view of a first embodiment of a solar collector according to the present invention.

The solar collector illustrated in FIG. 1 includes two concentric spheres 1 and 2. The outer sphere 1 is formed by the assembly along a horizontal jointing plane of two hemispheres 3 and 4 made of a transparent or translucent material, for instance a transparent synthetic material such as polymethacrylate (known under the trade name of PLEXIGLAS). The inner sphere 2, separated from the outer sphere 1 by a space 5 filled with air, may also be formed by an assembly of two hemispheres; this second sphere 2, which has to absorb the solar radiation, is made for example of metal coated with a dull black or other dark color.

The inner sphere 2 is kept inside and centered in the outer sphere 1 by a vertical support post 6 which extends through the lower outer hemisphere 4.

An inlet duct 7, conveying to the collector the fluid to be heated, penetrates an inner spherical chamber 8 defined by the sphere 2 near its lowermost part by extending through the support post 6. In the duct 7 is inserted a pump 9 situated outside the collector. The duct 7 is vertically prolongated towards the top inside the chamber 8, and the inner end of the duct 7 situated in the upper region of the chamber 8 carries a spray head 10.

An outlet duct 11 starting from the lowermost point of the inner chamber 8 extends from the collector through the support base 6.

The fluid to be heated, for instance water, is sprayed into the inner chamber 8, via the head 10. The water is thus projected firstly against the inner wall of the inner sphere 2 and flows downwardly along this wall; by so doing, the fluid recovers the heat stored in the space 5 via the sphere 2. The heated fluid is collected at the base of the inner sphere 2 by the outlet duct 11 which directs it towards a place of use or storage.

To the collector thus far described, is associated a reflector 12 formed of two plane, reflecting surfaces 13 and 14 forming an obtuse angle one with the other. The reflecting surface 13 is placed horizontally on the ground, below the collector. The other reflecting surface 14 is inclined and turned towards the South.

The spherical solar collector of simplified structure which has just been described is applicable to the economical production of hot water, notably for the heating of swimming pools and the like, and generally to all the thermo-solar conversions at low temperature.

FIGS. 2 and 3 illustrate a more particular application in which the solar collector also forms a street light or the like.

As is shown in FIG. 2, the collector according to the second embodiment, as seen from the outside, includes in this case a vertical support post 6' at the top of which is mounted a globe, the visible portion of which is the outer sphere 1', formed by the assembly along a horizontal jointing plane of two hemisphere 3' and 4' made of a transparent or translucent material such as methacrylate. The globe formed by these two hemispheres is supported by arcuate hoops 15 arranged outside.

FIG. 3 shows the inner structure of the solar collector of FIG. 2, its upper half, being separated from the lower half by a circular plane wall 16. The upper half forms the solar collector proper, and is made according to a hemispherical design which can be considered to be constituted in essence by one-half of a spherical design of FIG. 1 and to be very similar thereto. Beneath and spaced from the outer hemisphere 3' made of a translucent material is the inner sphere 2', concentric to the outer hemisphere 3' and separated from the latter by a space 5' filled with air; the inner hemisphere 2', which has to absorb the solar radiation, is made for example of metal coated with a dull black or other dark color.

The wall 16 and the inner hemisphere 2' circumscribe an inner hemispherical chamber 8' in which is sprayed the fluid to be heated. The fluid is conveyed by a duct 7' extending through the support post 6', and extends also vertically through the lower hemisphere 4', as well as the wall 16, and is prolongated vertically towards the top inside the chamber 8', and ends in a spray head 10'. An outlet duct 11' starting from the lowermost point of chamber 8', and therefore starting at the level of the upper surface of the wall 16, extends also, vertically, through the lower hemisphere 4' and the support post 6', for collecting the heated fluid and directing it towards a place of use and/or storage.

The lower outer hemisphere 4', made of a translucent material slightly tinted in white, circumscribes with the horizontal wall 16 another hemispherical chamber 17 inside which is arranged an electric bulb 18, held for instance by a support 19 fixed the lower surface of the wall 16. The electrical supply of the bulb 18 is provided by wires (not shown) which extend, of course, through the support post 6'. The material of the hemisphere 4' under which is housed the bulb 18 is provided with a color and further qualities providing it with the characteristics of a good light diffuser. Moreover, the wall 16, which is situated below the bulb 18, is made reflecting, thereby allowing directing back towards the ground the luminous energy which the bulb 18 emits upwardly.

It is also possible to recover the residual heat of the bulb 18, at night, for heating the heat-carrying fluid. To this end, there is provided an extra differential thermostat for controlling the heat-carrying fluid regulation pump, not shown, from a temperature probe 20 placed under the wall 16 which is over the bulb 18, the installation including always and, as is usual, a main differential thermostat controlling the input of solar hot water into a stock to be heated, during the day, from a probe measuring the stock temperature. Commutation between the "night" thermostat and "day" thermostat is carried out automatically by means of an electrical time-switch. If one considers, in the total energy quantity which is dissipated by an electric bulb, the portion of energy which is diffused in luminous form, and when comparing it to the quantity of absorbed energy, one sees the interest there would be to recover, as was just described hereabove, the quantity of energy which otherwise would be lost in the form of residual heat provided by the bulb 18.

The solar collector combined with a post and bulb as just described with reference to FIGS. 2 and 3 is applicable to the lighting of circulation thoroughfares, roadways, squares, plots of ground contiguous to buildings or industrial premises, parks, swimming pools (for which it supplies also the hot water) and the like. In the case of an installation which includes several similar collectors operating in comparable conditions, it is obvious that the hereabove mentioned thermostats may be common to the whole installation.

It goes without saying that the invention is not limited to the above described and illustrated embodiments which are hereabove described by way of example not by way of limitation. On the contrary, it encompasses all alternatives pertaining to the same principle, its scope being defined by the appended claims.

What is claimed is:

1. A solar collector comprising an outer semisphere and an inner semisphere having an inner wall surface, said outer semisphere and said inner semisphere being concentric with one another and having bases, said outer semisphere being permeable to solar radiation, and said inner semisphere being absorbent of the solar radiation; inlet means and outlet means for fluid to be heated, said inlet means including a duct prolongated upwardly inside an inner semispherical chamber defined by said inner semisphere; a spray head carried by said duct on its end and capable of projecting fluid to be heated onto said inner wall surface of said inner semisphere so that the fluid flows while being heated along said inner wall surface before being collected at said outlet means, said outlet means being positioned in a lowestmost point of said inner semispherical chamber; a substantially horizontal wall extending over the bases of said outer semisphere and said inner semisphere which, with said wall, defines said inner semispherical chamber, in which is sprayed fluid to be heated, in combination with a further semispherical chamber fixed beneath said wall and inside which is disposed at least one electric light bulb, a support post on top of which is mounted at some height above the ground said further semispherical chamber through which extends inlet means and said outlet means and also supply wires for said at least one light bulb, so as to form a solar collector combined with a street light.

2. A solar collector according to claim 1, wherein said outer semisphere and said inner semisphere are a respective outer hemisphere and an inner hemisphere.

3. A solar collector combined with a street light according to claim 1, wherein said horizontal wall is situated above said at least one light bulb and is reflecting.

4. A spherical solar captor combined with a street lamp, according to claim 1, including a differential thermostat, with a temperature probe placed under said wall which is above said at least one light bulb for controlling a fluid circulation pump and heating fluid by recovering residual heat of said at least one light bulb.

5. A solar collector combined with a street light according to claim 4, wherein said wall is a planar wall.

6. A solar collector combined with a street light according to claim 1, wherein said wall is a planar wall.

* * * * *